United States Patent [19]

Marshall

[11] Patent Number: 4,910,849

[45] Date of Patent: Mar. 27, 1990

[54] APPARATUS FOR PULLING GOLF CLUB SHAFTS FROM CLUB HEADS

[76] Inventor: Perry C. Marshall, 103 Granada Court North, Plant City, Fla. 33566

[21] Appl. No.: 350,069

[22] Filed: May 10, 1989

[51] Int. Cl.$^4$ .............................................. B23P 11/02

[52] U.S. Cl. ...................................................... 29/239

[58] Field of Search ................. 29/235, 234, 237, 238, 29/239, 450, 423, 280

[56] References Cited

U.S. PATENT DOCUMENTS

| | | | |
|---|---|---|---|
| 3,606,326 | 9/1971 | Sparks et al. | 29/450 |
| 3,835,522 | 9/1974 | Ward | 29/239 |
| 4,185,375 | 1/1980 | Brown | 29/450 |
| 4,653,170 | 3/1987 | Kelson | 29/450 |
| 4,677,872 | 7/1987 | Nishida | 29/235 |

*Primary Examiner*—Robert C. Watson

*Attorney, Agent, or Firm*—Ronald E. Smith; Joseph C. Mason

[57] ABSTRACT

A spring-loaded device that separates a golf club head and a golf club shaft to which it is adhesively secured. An elongate drive tube means has a distal end that engages a member that abuts the hosel part of the golf club head and a proximal end that carries a compression spring and a nut that compresses the spring when rotated. The proximal end of a golf club shaft is axially received and secured within a shaft engagement member that is disposed at the proximal end of the drive tube member in axial alignment with the drive tube but which is unsecured thereto. Thus, as the nut is rotated, the spring urges the shaft engaging member and the club shaft secured thereto to travel away from the hosel which is held against movement by the member that engages it. Heating the hosel releases the grip of the adhesive and the spring member drives the shaft out of the hosel before the shaft can suffer heat damage.

10 Claims, 3 Drawing Sheets

APPARATUS FOR PULLING GOLF CLUB SHAFTS FROM CLUB HEADS

TECHNICAL FIELD

This invention relates, generally, to puller devices that pull tightly secured objects from their mounts. More particularly, it relates to a puller device that pulls golf club heads from golf club shafts.

BACKGROUND ART

Pullers are available for pulling propellers from propeller shafts, bearing carriers from shafts, and the like. Moreover, pullers have been developed for pulling golf club heads from club shafts.

Although the art of pullers in general is well developed, the art has not yet reached its ultimate state of development, particularly in the golf club head pulling division of the art.

Modern golf club shafts are made of graphite or graphite reinforced with boron; some are fiberglass reinforced products. Typically, the distal end of a fiber shaft is axially received within the hosel of the golf club head and secured thereto by a thermoplastic adhesive means. Thus, when it is desired to change shafts, the hosel is heated to release the grip of the adhesive, and the shaft is manually pulled from the hosel.

The drawbacks of the just-described process are several. First of all, manual separation of the shaft from the hosel usually twists the shaft and destroys it since few people can pull hard on an object such as a golf club shaft without twisting it. Moreover, few people are strong enough to pull the shaft out until the adhesive has been greatly weakened by the application of a large amount of heat; as a result, the distal end of the shaft also becomes hot before the separation of shaft and hosel can be accomplished and the shaft is again ruined.

There is a need for a pulling device that generates a very strong, non-twisting pulling force when a golf club shaft is pulled from a club head so that the shaft can be pulled from the hosel at a time when the temperature of the hosel has been elevated to a temperature sufficient to release the grip of the adhesive but insufficient to adversely affect the distal end of the shaft.

The needed device does not appear in the prior art, nor does the prior art contain suggestions to those of ordinary skill in the art as to how such a device can be provided.

For example, U.S. Pat. No. 2,160,395 to Wettlauffer discloses a golf shaft puller having a nut that is constrained against travel by a washer so that rotation of the nut causes the axial displacement of a sleeve-like body onto which the nut is threaded. The threaded sleeve thus acts as a drive rod that separates the golf club head from the golf club shaft. However, no means are provided to accomplish an abrupt separation of the shaft and head in a non-twisting manner.

Other U.S. patents of interest include U.S. Pat. Nos. 1,662,465; 2,991,080; 3,334,405; 4,179,125; 4,317,986; 3,891,212; 4,462,595; 4,674,747; 4,783,893; and UK Pat. No. 2,186,195. Many of the puller devices of the prior art relate to pulling steel shafts from hosels; the problems relating to shaft twisting and overheating are not encountered when a steel shaft is being pulled.

DISCLOSURE OF INVENTION

The present invention is a pulling device specially adapted to pull golf club heads from the fiberglass shafts to which they are mounted.

Golf club heads include integral hosels; a hosel is a tubular member that axially receives the distal free end of a golf club shaft. A thermoplastic adhesive secures the end of the shaft within the hosel.

The novel device includes an elongate rigid drive tube member that axially receives a golf club shaft therein. A first side of a hosel-engaging means fits onto the distal end of the drive tube and a second side thereof bears against an annular rim of the hosel. Means are provided to pull the golf club shaft in a direction away from the hosel, but the drive tube is not secured to said means. The force that pulls the shaft out of the hosel is applied before the adhesive is heated. Thus, when the adhesive is softened by the application of heat, the shaft is abruptly pulled from the hosel before the shaft suffers any heat damage.

The means that pulls the shaft from the hosel includes a tubular shaft engaging member that axially receives the proximal end of the golf club shaft; it is not secured to the drive tube member. The shaft engaging member is axially aligned with the drive tube and is positioned at the proximal end thereof. A transverse bore is drilled into the proximal end of the golf club shaft and a corresponding bore is diametrically drilled into the shaft engaging member. A pin extends through the aligned bores when the proximal end of the shaft is axially received by the shaft engaging member, and secures the shaft to the shaft engaging member so that when the shaft engaging member is driven in a distal direction, away from the club head, the shaft is carried with it.

A bias means is employed to drive the shaft engaging member away from the club head, i.e., in a distal-to-proximal direction. It may be provided in pneumatic, hydraulic, or other form, but in the preferred embodiment of the invention the bias means is provided in part in the form of a compression spring that axially receives the proximal end of the drive tube. The proximal end of the drive tube is externally threaded and an internally threaded nut is screw threadedly engaged thereto. A first washer member abuts the nut and contains the distal end of the spring. A second washer member or annular flange means is fixedly secured to the shaft engaging member and serves to contain the proximal end of the spring. Thus, when the spring is compressed by rotation of the nut, the proximal end of the spring bears against the annular flange means and urges the shaft engaging means and the shaft engaged thereby to separate from the hosel. However, the adhesive prevents disengagement of the shaft and hosel until the hosel is heated and the adhesive therein is softened. The pre-loading of the spring results in a precipitous separation of the shaft and hosel when the adhesive is softened. Since the force of the spring is exerted in an axial direction, no twisting of the shaft occurs.

The primary object of this invention is to provide a device that separates golf club shafts of the graphite or fiberglass type and club heads in the absence of damage to the shaft.

The invention accordingly comprises the features of construction, combination of elements and arrangement of parts that will be exemplified in the descriptions set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which:

FIG. 8 is a partially cut away, side elevational view of a preferred embodiment of the invention, showing a golf club shaft received therewithin, but before the bias means has been compressed;

FIG. 9 is a view similar to that of FIG. 8, but showing the bias means in its compressed state and showing the heating of the hosel;

Similar reference numerals refer to similar parts throughout the several views of the drawings.

BEST MODES FOR CARRYING OUT THE INVENTION

Figures 1, 2, 3, 4, 5, 6, 7:
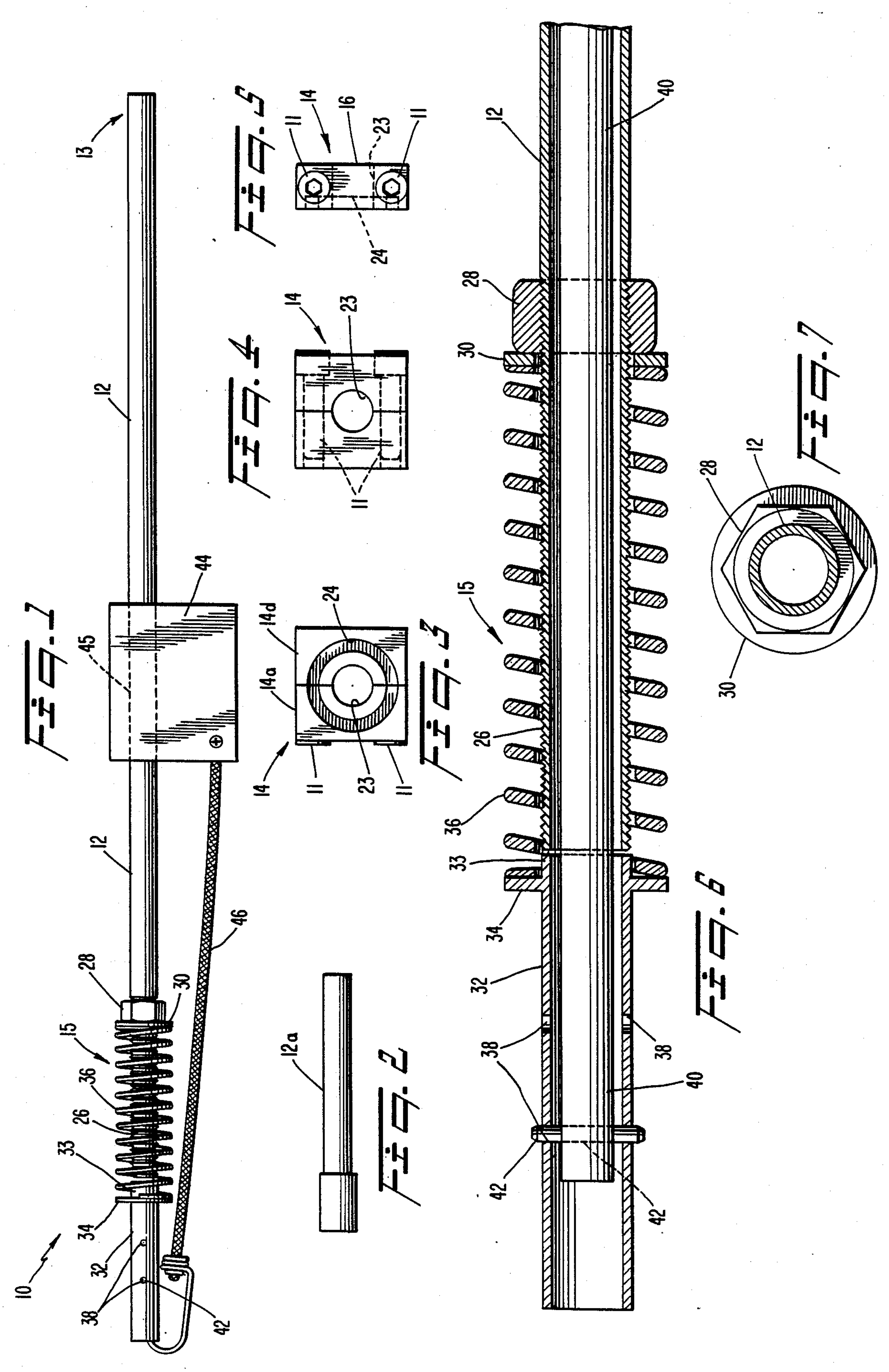
FIG. 1 is a side elevational view of the assembled parts of an illustrative embodiment of the invention.
FIG. 2 is a side elevational view of an extension drive tube member.
FIG. 3 is a front elevational view of the hosel-engaging member.
FIG. 4 is a side elevational view of the hosel-engaging member.
FIG. 5 is a top plan view of the hosel-engaging member.
FIG. 6 is a fragmented side elevational view of the proximal end of the drive tube member and of the shaft engaging member.
FIG. 7 is a front elevational view of the nut and washer shown in FIGS. 1 and 3.
Figure 4:
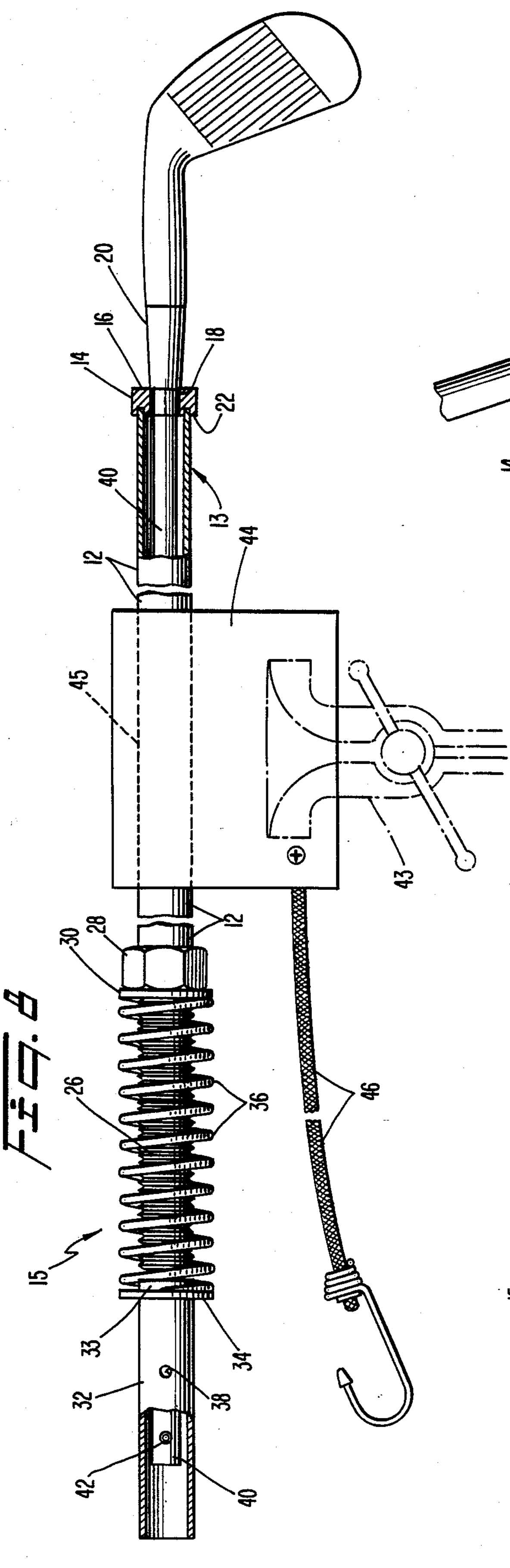
Figure 5:
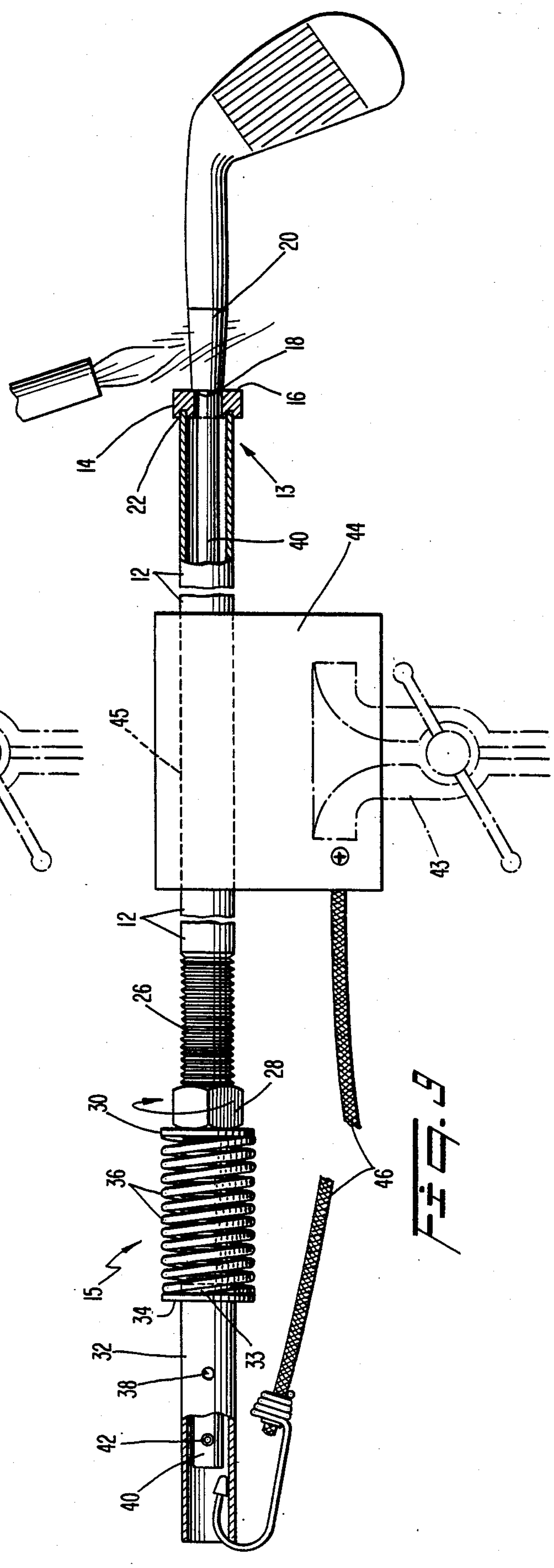

Referring now to FIG. 1, it will there be seen that an illustrative embodiment of the present invention is denoted by the reference numeral 10 as a whole.

Figure 12:
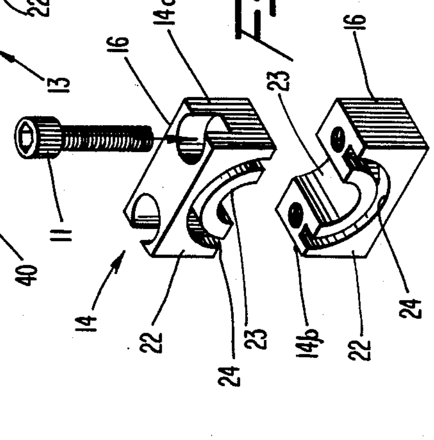
FIG. 12 is an exploded perspective view of the hosel engaging member.

Puller 10 includes a steel drive tube 12; both single piece and multi-piece drive tubes 12 are within the scope of this invention. Extension 12*a*, shown in FIG. 2, may be secured to the distal end 13 of puller 10; the proximal end of the puller is denoted 15. A hosel-engaging member 14 has a central bore 23 that receives the distal end of the drive tube 12 and includes parts 14*a*, 14*b* as best shown in FIG. 12; when the parts are joined together by screws 11 as shown or other suitable fastening means, member 14 receives distal end 13 of drive tube 12 as shown in FIGS. 8–11. More particularly, surface 22 of member 14 has an annular groove 24 that receives the distal end 13 of drive tube 12, and flat surface 16 of member 14 abuttingly engages annular rim 18 of hosel 20. Accordingly, when puller 10 is in operation, distal end 13 of drive tube 12 bears against the annular bottom wall of groove 24 and surface 16 of member 14 bears against annular rim 18 of hosel 20 with equal force.

The proximal end 15 of drive tube 12, at the left side of the drawings, is externally threaded as at 26. Nut 28 is screw threadedly engaged thereto; washer 30 abuts nut 28 and travels therewith.

A shaft engaging member 32 is disposed in axial alignment with drive tube 12 but is not fixedly connected thereto, as perhaps best shown in FIGS. 1 and 3. An annular flange member 34 is integral or fixedly secured to shaft engaging member 32 and cooperates with washer 30 to maintain compression spring 36 in sandwiched relation therebetween.

Although shaft engaging member 32 is unconnected to drive tube 12, it is configured as at 33 so that part 33 is axially received by spring 36 to maintain the shaft engaging member 32 and the drive tube 12 in axial alignment with one another.

A plurality of diametrically disposed bore members, collectively denoted 38, are formed in shaft engaging member 32. A golf club shaft 40 is similarly bored within an inch or so of its proximal end so that when the bore formed in the shaft is aligned with a preselected bore 38, depending upon the length of the shaft, a pin 42 inserted through the aligned bores will yoke together shaft 40 and shaft engaging member 32.

A mounting means 44, which may take the form of a wooden block member or other suitable form, is bored as at 45 to securely receive drive tube 12. When puller 10 is in use, a vice 43 (FIGS. 8 and 9) is employed to grip the mounting means 44 and hence drive tube 12 to secure it against movement.

Puller 10 is used by inserting golf club shaft 40 that has been bored as above mentioned into drive tube 12; the proximal end of the shaft is received by shaft engaging member 32 and pin 42 is inserted when the shaft bore and a preselected bore 38 are aligned. See FIG. 8. Nut 28 is rotated to advance it in a proximal-to-distal direction. See FIG. 9. This will compress spring 36 and spring 36 will urge flange or second washer 34 and hence shaft engaging member 32 and shaft 40 to also travel in a distal-to-proximal direction. However, the shaft 40 will be constrained against such movement due to the adhesive which secures it within hosel 20.

Figure 10:
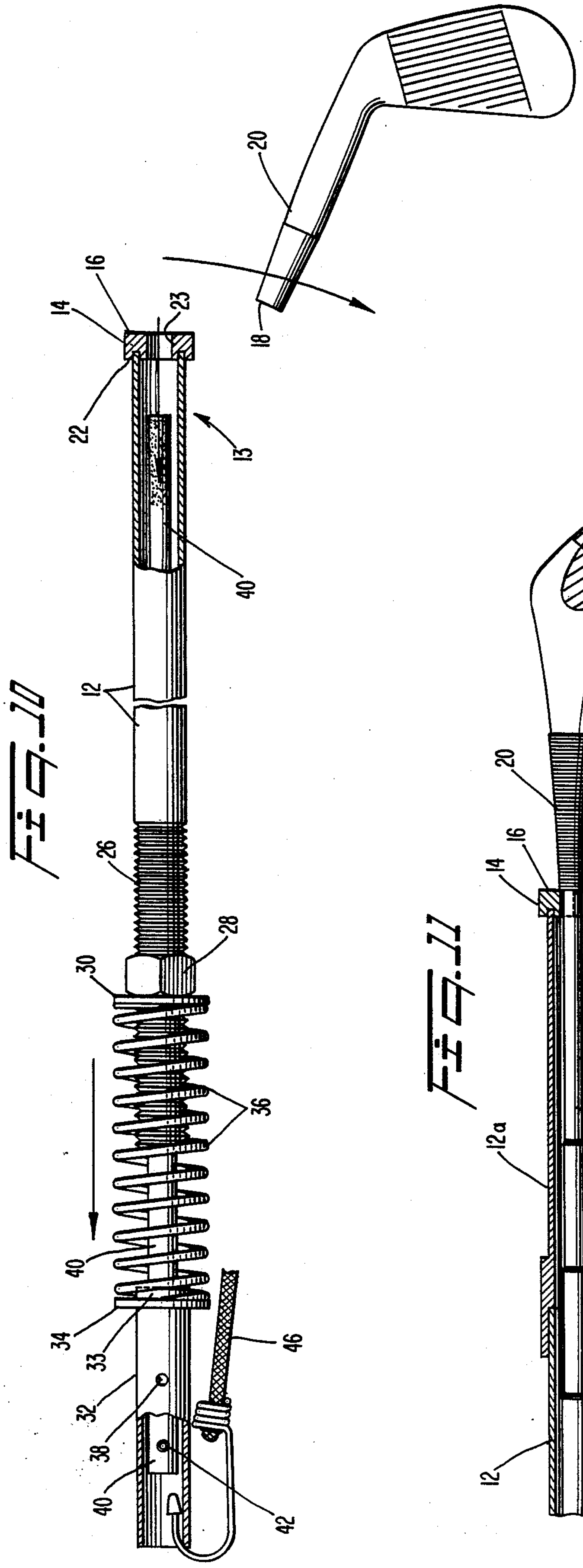
FIG. 10 is a side elevational view similar to that of FIGS. 8 and 9, but showing the unloading of the bias means and the uncoupling of the golf club shaft from the golf club head hosel.
Figure 11:
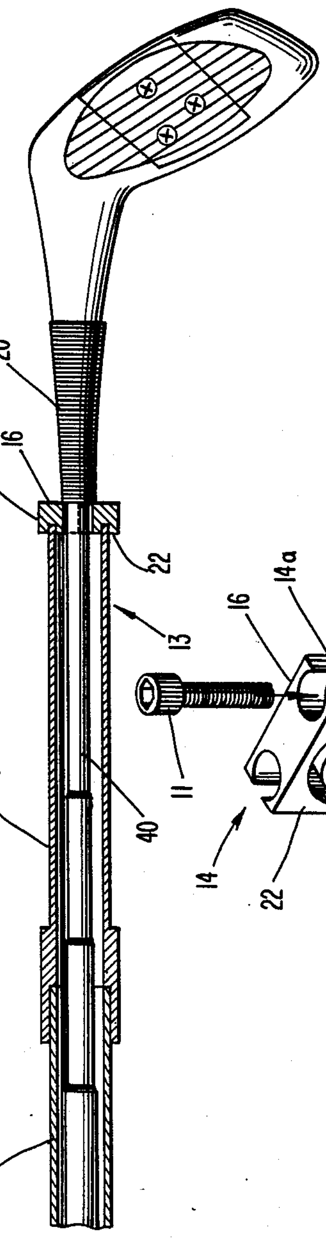
FIG. 11 is a side elevational view showing the drive tube extension of FIG. 2 in use.

In a commercial embodiment of the invention, after nut 28 has traveled an inch or two, spring 36 will apply several hundred pounds of pressure against flange 34, thereby urging shaft 40 to separate from hosel 20. Accordingly, after said pressure has been applied, hosel 20 is heated, as shown in FIG. 9, the thermoplastic adhesive softens, and shaft 40 is abruptly withdrawn therefrom as spring 36 unloads, as depicted in FIG. 10. Since the force exerted by the spring is applied in an axial direction, no twisting of shaft 40 occurs as happens when such shafts are manually pulled. Just as importantly, due to the very high strength of the pull provided by spring 36, the adhesive need soften only a little before separation occurs. Thus, the graphite or fiber shaft is not damaged and a different club head can be applied thereto.

A bungy cord 46 is mounted at one end to mounting block 44 and the other end thereof is hooked to shaft engaging member 32 as shown in FIGS. 1 and 10. Cord 46 prevents shaft 40 and engaging member 32 from following a spear-like trajectory when spring 36 unloads.

The novel device is the first device that enables the changing of golf club shafts formed of fiberglass reinforced materials in the complete absence of damage to the shaft. As such, it is a pioneering invention and the claims that follow are entitled to broad interpretation, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. An apparatus that separates a golf club shaft and a golf club head that are secured to one another by a thermoplastic adhesive, comprising:

an elongate drive tube member having a diameter sufficient to axially receive therein the shaft of a golf club;

a hosel-engaging means positioned at the distal free end of said drive tube member for abuttingly engaging the hosel of a golf club head;

a tubular shaft engaging means disposed in axial alignment with the proximal end of said drive tube member, said shaft engaging means axially receiving and securing the proximal end of a golf club shaft inserted thereinto;

said shaft engaging means being unconnected to said drive tube member; and a bias means carried by the proximal end of said drive tube member, said bias means urging said shaft engaging means in a distal to proximal direction;

whereby said bias means urges separation of said golf club head from said shaft by urging said shaft engaging means and the golf club shaft secured thereto in a distal direction when said hosel-engaging means bears against said hosel.

2. The apparatus of claim 1, further comprising a mounting means fixedly secured to said drive tube member so that a vice means may grip said mounting means to secure the drive tube member against movement when said bias means urges said shaft engaging means and the shaft secured thereto to displace in a distal direction.

3. The apparatus of claim 1, wherein the proximal end of the drive tube member is externally threaded, wherein an internally threaded nut means is screw threadedly engaged to said threaded proximal end, and wherein proximal-to-distal travel of said nut means compresses said bias means and causes it to increasingly urge said shaft engaging means to travel in a proximal-to-distal direction.

4. The apparatus of claim 3, wherein said bias means is a compression spring and wherein said spring is disposed between a first and second washer member, said first washer member abutting and being movable by said nut and said second washer member being fixedly secured to said shaft engaging means and conjointly movable therewith.

5. The apparatus of claim 1, further comprising at least one bore means formed in said shaft engaging means, said at least one bore means being transverse to a longitudinal axis of symmetry of said shaft engaging means, and further comprising a pin member that has a length greater than the diameter of said shaft engaging means, said pin member being slidably received by said at least one bore means;

whereby a golf club shaft having its proximal end received within said shaft engaging means is secured thereto when a transverse bore drilled into the proximal end of said golf club shaft receives said pin member.

6. The apparatus of claim 1, wherein said hosel-engaging means is a split clamp member having two separate halves that are secured to one another, wherein a distal side of said split clamp member abuttingly engages an annular rim of said hosel member and wherein a proximal side of said split clamp member has an annular groove formed therein to receive the distal free end of said drive tube member.

7. A golf shaft puller, comprising:

an elongate hollow drive tube member having an inner diameter sufficient to axially receive a golf club shaft;

a hollow golf club shaft engaging member disposed in axial alignment with said drive tube member, said shaft engaging member having an inner diameter sufficient to axially receive a first end of a golf club shaft;

at least one diametrically extending bore means formed in said shaft-engaging member;

a pin member that extends through said bore means, said pin member having a length greater than the inner diameter of said shaft-engaging member;

a radially extending flange member being fixedly secured to said shaft-engaging member;

external thread means formed in a first end of said drive tube member;

an internally threaded nut member disposed in screw threaded engagement with said external thread means;

a radially extending washer member axially received by said externally threaded first end of said drive tube member, said washer member abutting said nut member;

a bias means disposed in sandwiched relation between said washer member and said flange member;

a hosel-engaging member positioned in abutting relation to a second end of said drive tube member;

an annular groove means formed in a first side of said hosel-engaging member, a leading edge of said second end of said drive tube member being positioned within said groove means;

a central bore means formed in said hosel-engaging member, said central bore means having a diameter sufficient to receive therein a second end of said golf club shaft;

said diameter of said central bore means being insufficient to receive a hosel of said golf club head so that a second side of said hosel-engaging member abuttingly engages an annular rim of said hosel; and holding means for holding said drive tube member against movement when the golf shaft puller is in use.

8. The puller of claim 7, wherein said holding means includes a flat member grippable by a vice means, said flat member being fixedly secured to said drive tube member.

9. The puller of claim 8, further comprising retaining means for preventing said shaft-engaging member and said shaft from traveling to a location remote from said drive tube member when the bias means unloads.

10. The puller of claim 9, wherein said retaining means includes a bungy cord means having a first end secured to said holding means and a second end secured to said shaft engaging member.

* * * * *